United States Patent [19]
Pottorff

[11] Patent Number: 5,942,256
[45] Date of Patent: *Aug. 24, 1999

[54] BUBBLE STABILIZER AND SIZING CAGE WITH WEAR STRIPS

[76] Inventor: Earl T. Pottorff, 2436 Taylor Rd., Savannah, N.Y. 13146

[*] Notice: This patent is subject to a terminal disclaimer.

[21] Appl. No.: 08/927,133

[22] Filed: Sep. 2, 1997

Related U.S. Application Data

[62] Division of application No. 08/653,791, May 28, 1996, Pat. No. 5,700,489
[60] Provisional application No. 60/014,757, Apr. 8, 1996.

[51] Int. Cl.$^6$ ................................................. B29C 47/90
[52] U.S. Cl. ................ 425/72.1; 264/209.4; 264/565; 425/326.1; 425/384; 425/387.1; 425/392
[58] Field of Search ................................ 425/72.1, 326.1, 425/384, 392, 445, 566, 569, 387.1; 264/565, 209.4

[56] References Cited

U.S. PATENT DOCUMENTS

| | | | |
|---|---|---|---|
| 3,749,540 | 7/1973 | Upmeier | 425/326 |
| 4,355,966 | 10/1982 | Sweeney et al. | 425/140 |
| 4,388,061 | 6/1983 | Bebok | 425/390 |
| 4,408,970 | 10/1983 | Bustin et al. | 425/72 R |
| 4,717,323 | 1/1988 | Karl et al. | 425/72 R |
| 4,749,346 | 6/1988 | Planeta | 425/72.1 |
| 4,943,226 | 7/1990 | Pottorff | 425/326.1 |
| 5,700,489 | 12/1997 | Pottorff | 425/392 |

*Primary Examiner*—Harold Pyon
*Assistant Examiner*—Joseph Leyson
*Attorney, Agent, or Firm*—Trapani & Molldrem

[57] ABSTRACT

An external stabilizer employed in a plastic film blowing apparatus incorporates one or more extruded members that carry a low-friction plastic wear cover. A tubular die, fed with a supply of molten thermoplastic polymer, extrudes a tube of the molten polymer and injects air into said extruded tube to inflate the tube into a bubble. The wall of the tube expands into a film of a desired thickness; and the tube is drawn vertically upward and collapsed and flattened. The external stabilizer is positioned on a frame surrounding the extruded tube above the die to keep the tube aligned on a predetermined path as the tube is drawn upwards. The stabilizer includes at least one extrusion of a light-weight material having a profile that is rounded on a side that faces the extruded tube so that said extrusion has a rounded front surface. The associated wear cover is made of a wear resistant plastic material and is disposed on said rounded front surface of said extrusion. In one possible embodiment, the stabilizer is formed as an extruded helix. The extrusion can be aluminum and with a mushroom-shaped cross section. Preferably, the extrusion has a hollow core and is fitted with piping for fluid cooling.

8 Claims, 5 Drawing Sheets

BUBBLE STABILIZER AND SIZING CAGE WITH WEAR STRIPS

RELATED APPLICATION DATA

This application is a Division of U.S. application Ser. No. 08/653,791, filed on May 28, 1996, now U.S. Pat. No. 5,700,489, which claims the benefit of U.S. Provisional Application No. 60/014,757, filed on Apr. 8, 1996.

BACKGROUND OF THE INVENTION

The present invention relates to the fabrication and processing of plastic film, and is more specifically directed to stabilizers for maintaining a tubular extrusion of blown plastic film, that is, a bubble, on a predetermined path during the extrusion process. The invention is more particularly concerned with improvements to an external guide or stabilizer arrangement that minimizes or eliminates problems caused by friction or film distortion as the extruded thermoplastic material is drawn through the guide stabilizer or sizing cage.

Polyethylene film or films of other thermoplastic materials are produced using a blown film process, in which molten thermoplastic material is fed to an annular extrusion die and the latter produces a tubular extrusion, i.e. a bubble, of the material, which is drawn upwards and solidifies into film. An air jet incorporated in the die injects air into the interior of the extrusion to inflate the bubble or tube. The film in the extrusion is initially somewhat fluid, and inflates to a larger diameter, with a correspondingly thinner wall, cooling and solidifying when a predetermined thickness is reached. The process is controlled and adjusted so that the film has a uniform thickness, and this basic process is well known in the art. The tubular extrusion is drawn upwards and flattened between a pair of rollers, i.e., nip rollers, that are positioned above the die. Typically, a collapsing frame is provided to urge opposite sides of the tubular extrusion towards one another just before the tube reaches the nip rollers. The collapsing frame may consist of a pair of opposed arrays of horizontal collapsing boards of any of a number of well-known configurations, and one arrangement is discussed in U.S. Pat. No. 4,943,226, granted Jul. 24, 1990. The film exits the nip rollers as multiple-thicknesses of film, and the film proceeds from there to various cutting, printing, rolling, or other equipment.

As mentioned above, it is important that the thickness, as well as strength and other properties, of the produced film be as uniform as possible. It is also necessary to the quality of the film that it be relatively free of weak regions and tears. For those reasons, stabilizer arrangements are used to keep the tubular extrusion confined to a well-defined travel path as it proceeds from the die to the nip rollers. Guide cages or other external stabilizers can be positioned outside the bubble for this purpose. In some cases internal guide members can disposed atop the extrusion die and within the bubble, both to prevent the tubular extrusion from drifting off the axis of travel, and also to assist in the direction of air flow within the bubble from the die.

At the current time, an external stabilizer takes the form of a series of banks of bowed arms positioned at intervals around the tubular extrusion. In one arrangement that is often used, each arm carries a row of rollers made of PTFE (Teflon). The arms are positioned just out of contact with the bubble, or else in light contact. When the bubble or extrusion drifts laterally, i.e., away from its vertical axis, the film contacts the arms and rollers on that side. As the extrusion moves past the arms, the rollers turn, and also push the extrusion back towards the vertical axis. Unfortunately, the extruded plastic is highly abrasive, so that when the bubble moves vertically past the rollers at high speed, it tends to wear the rollers flat on one side. Also, because the rollers are positioned along a curve, the adjacent rollers touch on the bubble side, but are spaced from one another on the outer side of the arms. Therefore, there is a tendency for the rollers to pinch the film as it moves past, creating snags and tears. This is especially the case where the rollers exhibit wear and so that material has eroded away. Furthermore, it is difficult and expensive to replace worn PTFE rollers, and replacement typically involves replacing all the rollers along the entire bowed arm. In addition, the materials and construction involved make the external stabilizer of this design rather expensive.

A recognized problem in the blown film art is that blown film has different stretch and strength characteristics in the axial or machine direction from what is achieved in the transverse direction, i.e., circumferentially around the extrusion. This occurs because is has been difficult to control the expansion of the bubble in both directions at the same time. Ideally, the strength in the machine direction, or MD, should be the same as the strength in the transverse direction, or TD. Stabilizing the position of the extrusion or bubble would help in this regard. Also, controlling rotation of the bubble as it rises will affect these properties.

OBJECTS AND SUMMARY OF THE INVENTION

Accordingly, it is an object of this invention to provide an external guide member for a blown film operation that avoids the drawbacks of the prior art.

It is another object of the invention to provide a guide member that provides long life and significantly reduces friction and other related problems with respect to the extruded film that is being drawn therethrough.

It is yet another object to increase control over bubble rotation, and thus obtain more uniform relative film strengths in the TD and MD directions.

According to an aspect of the present invention, improved external stabilizer and sizing cage means are provided for plastic film blowing apparatus of the type in which a tubular extrusion die is fed with a supply of a molten thermoplastic polymer and extrudes a tube of the molten polymer. The die injects air to inflate the tube and expand the wall of the tube into a film of a predetermined film thickness. Nip roller means positioned above the die at the top of the bubble draw the tube vertically upward from the die and collapse and flatten the film. The external stabilizer means are positioned on a frame that surrounds the extruded tube above the die, and keep the tube aligned on a predetermined path between the die and the roller means as the tube is drawn upwards. The improved external stabilizer means comprise an extrusion of aluminum or other light-weight metal, in combination with low-friction wear material disposed on its front surface. In one favorable embodiment, the aluminum extrusion has a mushroom-shaped cross section, with a half-round (i.e., semi-cylindrical) front side, a flat back plate, and upper and lower recesses or notches. The wear material is in the form of a low-friction plastic extrusion having a half-round profile that matches the shape of the front side of the aluminum extrusion, and upper and lower inwardly-directed flanges or lips that fit into the recesses of the extrusion. The plastic wear covers can be replaced when worn simply by snapping or sliding them off and similarly replacing them with a fresh wear cover. In one preferred mode, the stabilizer can be in the form of a coil or spiral, formed of a single length of the extruded metal including the plastic wear cover. The direction of the spiral, and the pitch or helix angle can be selected to influence the rotation of the bubble as it is drawn through the stabilizer. The helix is disposed coaxially with the extruded bubble. In another embodiment, a low friction coating on the tubular metal extrusion can provide the low-friction surface, such that the spiral is one piece. A frame or a series of brackets establish the pitch or turn length, and hold the stabilizer in a more-or-less rigid position.

A flow of air or water can be provided in the interior of the metal extrusions for controlled cooling. To facilitate this, the metal can be extruded with a round bore, which can be fitted with pipes or nipples at its end for injection and discharge of the coolant fluid. Alternatively, the extrusion can have an open interior, and can be fitted with end plates that carry coolant fittings.

In the case of replaceable covers or wear plates, the front face can be made of two layers, with a backing layer of a distinctive color which will be revealed when the face layer is worn down and needs to be replaced.

The above and many other objects, features, and advantages of this invention will become apparent from the ensuing description of an exemplary embodiment, which should be read in conjunction with the accompanying Drawing.

DETAILED DESCRIPTION OF THE PREFERRED EMBODIMENTS

Figure 1:
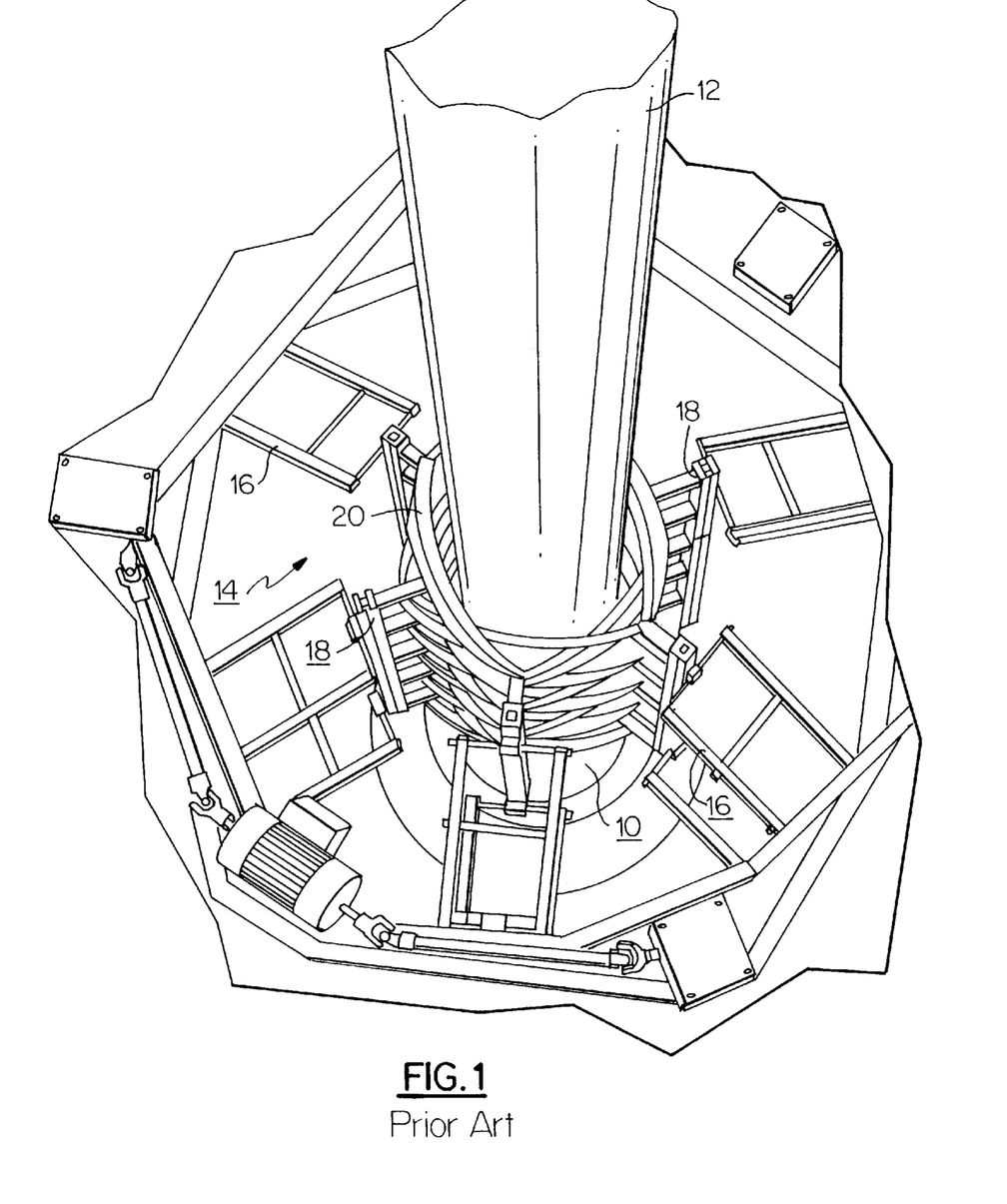
FIG. 1 is a perspective view of a blown film extrusion arrangement showing an external stabilizer or sizing cage of the prior art.

With reference to the Drawing, FIG. 1 illustrates a blown film extrusion assembly that includes an internal stabilizer according to the prior art. Here an extrusion die 10 is supplied with a molten thermoplastic material, e.g. polyethylene, polypropylene, PVC, or another thermoplastic resin. The die 10 has a circular or annular opening, and an air injection jet is disposed within the opening. The die 10 produces an extruded tube 12 or bubble of the molten material, which is drawn upwards and inflates until the wall of the extrusion is expanded to a design thickness. The film thickness can typically be in a range from about 0.3 mils to several mils, depending on the intended end use for the plastic film. In many instances, the die 10 is rotated during extrusion so as to avoid longitudinal weak areas and to increase the film strength in the transverse direction (TD). As the film is drawn upwards, the tube 12 must be flattened, and so a collapsing frame (not shown) is provided well above the die 10 to urge opposite sides of the tubular extrusion 12 towards one another. A collapsing frame is described in U.S. Pat. No. 4,943,226. A pair of nip rollers or pinch rollers (not shown) are disposed above the collapser to flatten the tube into a multiple thickness of film. These nip rollers also draw the extrusion or bubble upward at a controlled rate. The elevation of the nip rollers above the die 10 can be forty feet or more.

As the tubular extrusion 12 is drawn vertically upwards, the air within the tube expands the tube outward until the thermoplastic material sets. Typically there is a so-called "frost line" on the moving extrusion at the vertical position where the plastic has cooled and can no longer be expanded.

Because of the great distance from the die 10 to the nip rollers, the travel path of the tubular extrusion can drift away from the axis between the die and rollers. This drift can lead to unacceptable irregularities, e.g., weak regions, tears, or pulls in the film product. For that reason, the blown film arrangement typically will employ means to stabilize the path of vertical travel of the extrusion 12, especially below the frost line where expansion occurs. These means can include internal stabilizers, external stabilizers, or some combination of the two. Here, an external stabilizer 14 is employed above the frost line to control or limit transverse drift. Because of the heat carried by the molten plastic, some type of heat management is needed if the external stabilizer 14 is positioned below the frost line, or is otherwise positioned near the die 10. Otherwise, the heat of the extrusion can actually damage the external stabilizer.

In this arrangement, the external stabilizer incorporates an adjustable frame 16 which 10 carries support members 18 disposed at about sixty-degree intervals, so that there are six of these supports 18. Each support carries a set of curved or bowed arms 20 which are positioned to contact the tubular extrusion 12 if it drifts off axis. Each support carries four of these arms 20 disposed vertically one above the other. The frame 16 can be adapted to move the arms 20 in or out to accommodate the size of the plastic film extrusion or bubble 12.

Figure 2:
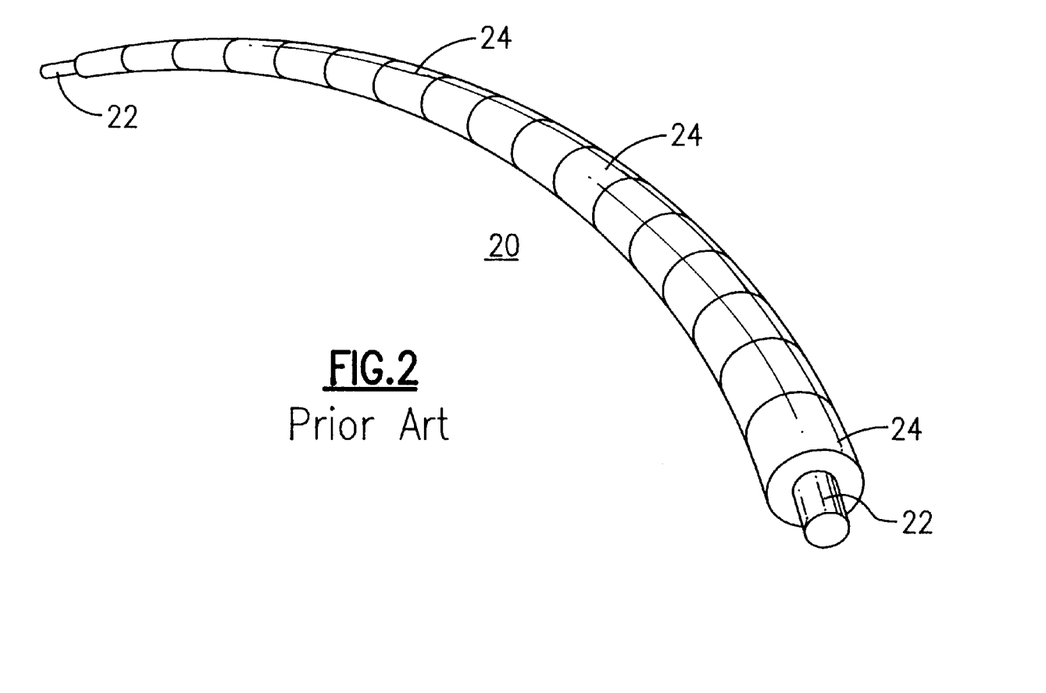
FIG. 2 is a perspective view of a curved arm of the prior art stabilizer of FIG. 1.

As shown in FIG. 2, each arm is comprised of a curved rod 22 which carries a string of rollers 24, with the rollers disposed side by side. The rollers are made of Teflon, i.e., PTFE, so as to be wear-resistant. In this arrangement, the rollers 24, being situated on a curve, touch one another on the proximal or bubble side, but are spaced slightly away from one another on the distal or outer side of the arm 20. Then, as the rollers 24 wear, their diameter reduces and their rounded edges wear sharp. Consequently, they may not remain in contact on the proximal side. Consequently, there is a tendency for the film to become pinched between adjacent rollers 24, which can lead to tears and snags in the film. Moreover, there is high friction from the additives or powders in the moving plastic film, and these can tend to wear the rollers. In some cases, the rollers can wear flat on one side, which also produces flaws in the film product.

Figure 3:
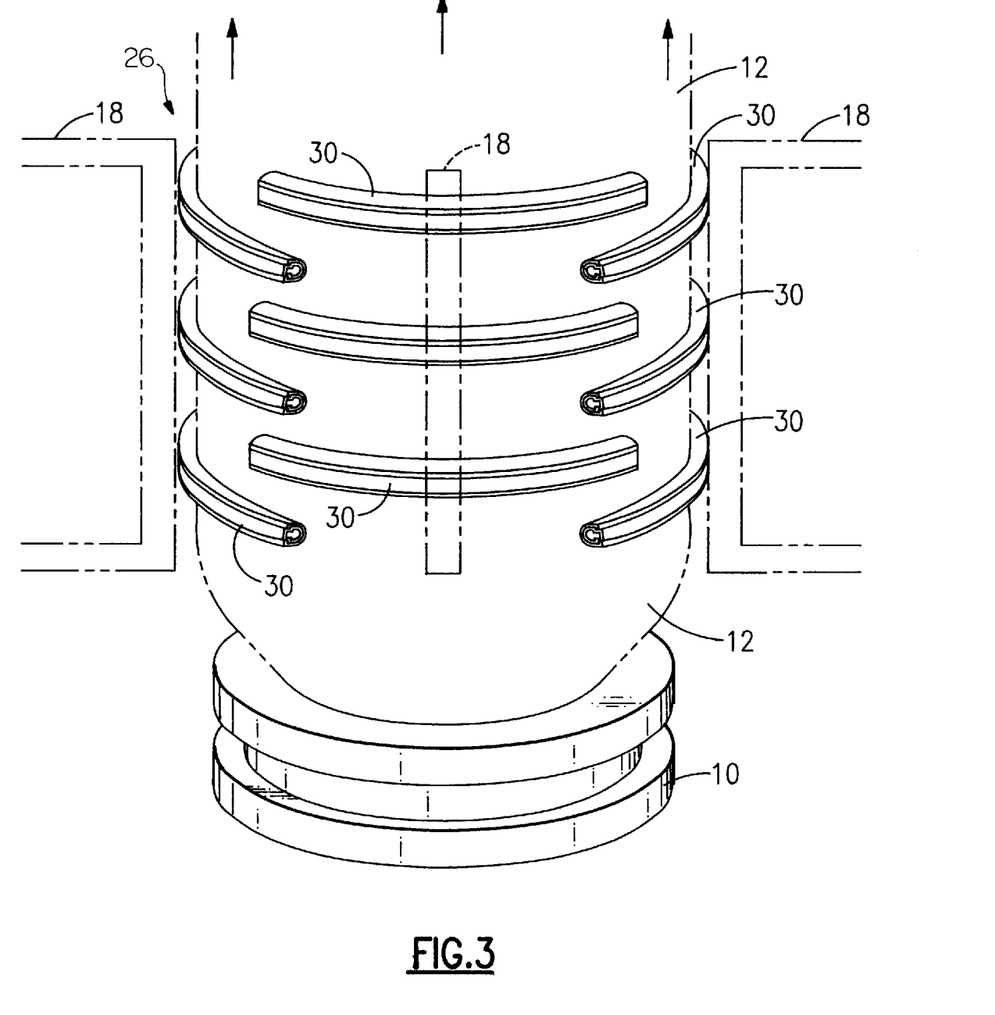
FIG. 3 is an elevational view showing a film extrusion arrangement with an improved external stabilizer according to one embodiment of this invention.
Figure 4:
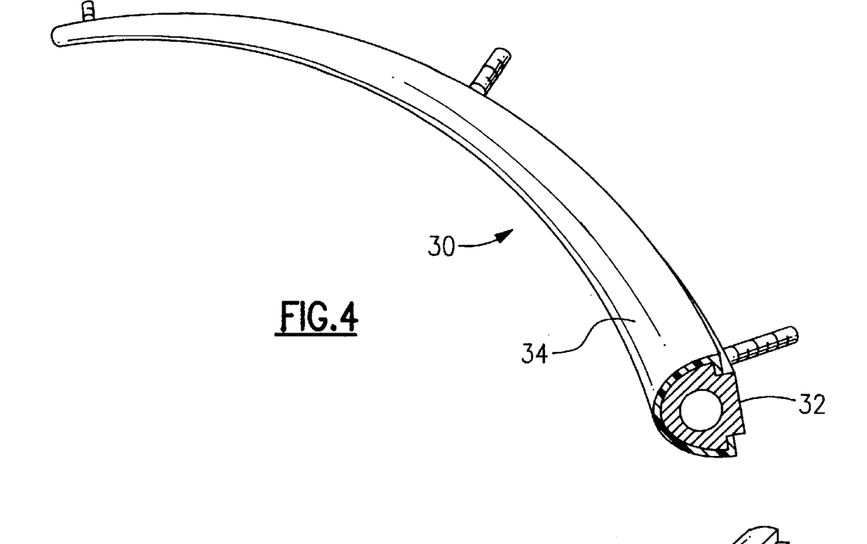
FIGS. 4 and 5 are perspective views showing proximal and distal sides of the curved arms of the external stabilizer of this embodiment.
Figure 5:
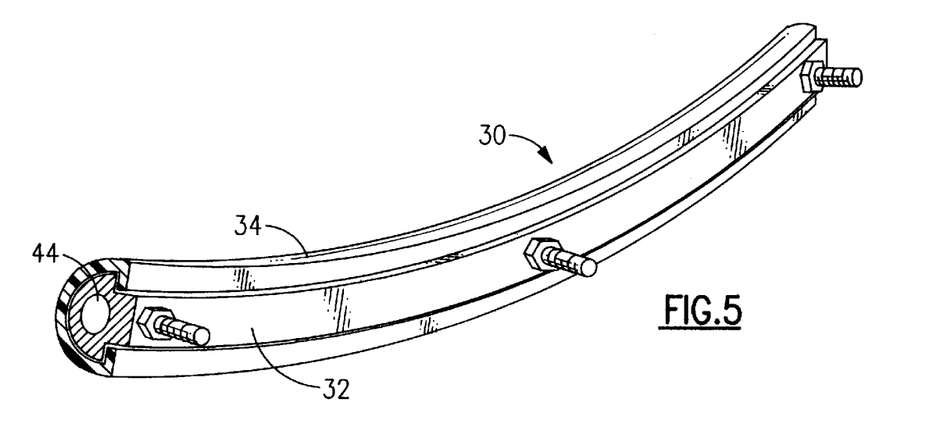

An improved external stabilizer 26 according to an embodiment of this invention is shown in FIG. 3, with further reference to FIGS. 4 and 5. Here, the extrusion die 10 and bubble 12 are identified with the same reference numerals as used previously. Other elements which are unchanged from the previously described arrangement are also identified with the same reference numerals, and a detailed description thereof will be omitted. There can be four sets of arms 30 situated at 90° intervals, six sets at 60° intervals, five sets at 72° intervals, or other configurations.

In this external stabilizer 26, curved arms 30 are arranged so as to be supported on support members 18. That is, the curved arms can be retrofitted in place of the Teflon-roller arms 20 of the prior-art arrangement described above. The arms 30 are made of a curved aluminum extrusion 32 with a low-friction plastic cover or wear strip 34, as shown in more detail in FIGS. 4 and 5.

Figure 6:
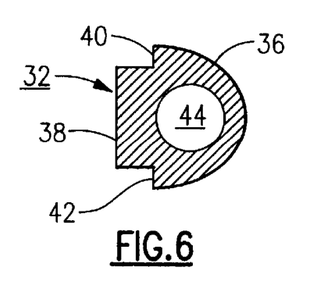
FIGS. 6 and 7 are cross-sections showing the profiles of the metal extrusion and the matching wear strip or cover, respectively, as employed in this embodiment.

The aluminum extrusion 32 has a generally mushroom shaped cross section (See FIG. 6) with a cylindrical or half-round front face 36 on the inside of the curve, that is positioned proximally facing the plastic film bubble 12, and with a flat back or distal surface 38. There are upper and lower recesses or notches 40 and 42 between the front face 32 and the back 38. A circular bore 44 is formed in the aluminum extrusion, and extends through the length of the arm 30. This provides a passage for circulation of a coolant fluid, such as water or air, and the bore 44 can be threaded at ends of the arms 30 for connecting a nipple, pipe, or other suitable fitting to connect to a supply and return for the cooling fluid.

Figure 7:
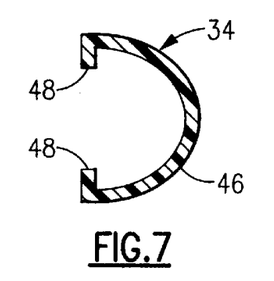

The plastic cover or wear strip 34 (see FIG. 7) has a curved portion 46 that is half-round to match the profile of the front face 36 of the aluminum extrusion, and inwardly protruding flanges or lips 48 that fit into the upper and lower recesses 40 and 42, respectively, of the extrusion 32, so that the cover or wear strip 34 fits the extrusion 32 as shown in FIGS. 4 and 5. The cover or wear strip 34 is favorably made of a semi-rigid plastic resin with a lubricant fill, e.g., graphite, so that there will be a low coefficient of friction with the extruded plastic film, and so that the wear strip itself will enjoy long life.

Figure 8:
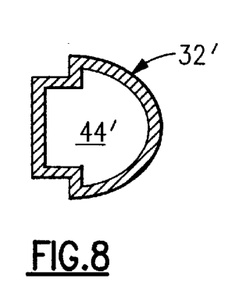
FIG. 8. is a cross-section showing an alternative profile of a metal extrusion that may be employed.

An alternative arrangement of the aluminum extrusion is shown in cross section in FIG. 8. Here the extrusion 32' has walls of substantially uniform thickness so as to have a mushroom shaped hollow interior 44'. In this case, end plates (not shown) can be employed to attach piping or other fittings to ends of the arms.

Figure 9:
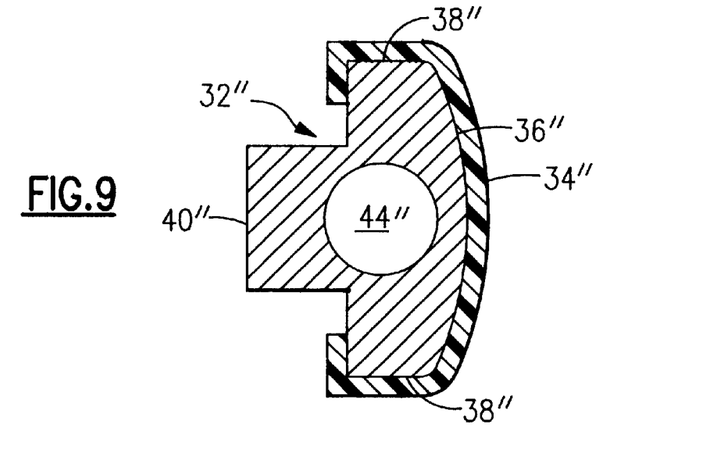
FIG. 9. is a cross-section showing another alternative profile of a metal extrusion and plastic wear cover that may be employed.

A further embodiment is shown in FIG. 9, in which the extrusion 32" has a generally T-shaped profile, with a curved front surface 36" and flattened top and bottom edges 38", 38". The back plate portion 40", that is the stem of the T-shaped profile, can have a width of 0.75 inches, and the front surface, i.e., between the edges 38", 38", can have a width of 1.5 inches, with the front surface 36" having a radius of 2.0 inches. The bore or open core 44" can be 7/16 inches in diameter and centered. Here the cover or wear plate 34" has a profile that matches that of the aluminum extrusion 32" and is formed of a suitable extruded plastic material, for example, Kinar and nylon 6/4, or an ultra-high molecular weight polyethylene, with a thickness of 0.040 to 0.060 inches. The material can include a suitable lubricant and can incorporate a die, e.g., bright blue.

Of course, other possible cross sectional shapes of extrusion and wear cover could be used, so long as the stabilizer presents a smooth sliding surface of the low-friction material to the tubular extrusion 12 that moves through it.

Figure 10:
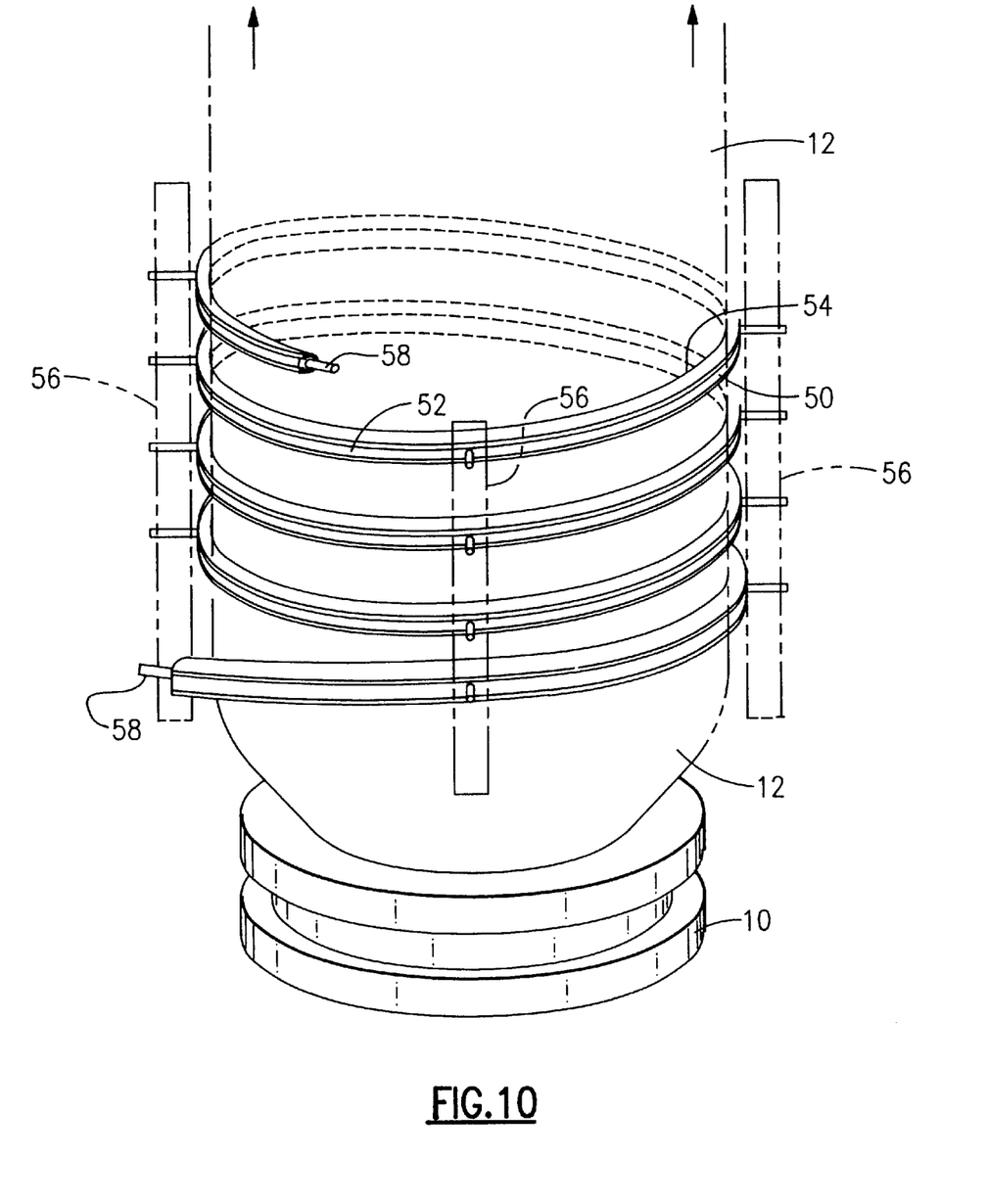
FIG. 10 is an elevational view showing a film extrusion arrangement with an improved external stabilizer according to an alternative embodiment.

Another possible embodiment of the present invention is shown in FIG. 10. Here, elements that correspond to elements previously described will be identified with the same reference numbers, and a detailed description will be omitted. In this embodiment, an external bubble guide is formed as a helix 50 or coil with an aluminum or other metal extrusion 52 with a mating cover or wear plate 54. The extrusion 52 and wear plate 54 have the same profile (FIGS. 6 and 7, respectively) as those of the first embodiment. Here the extrusion 52 and cover or wear plate 54 are bent into a helix having a uniform radius and pitch (or turn spacing). The helix 50 has a finite helix angle. In this illustrative embodiment, helix 50 continues all the way around the bubble 12, here spiraling for between 3 and 4 turns. In an alternative arrangement, the coil can be of smaller radius near the die 10, and then of gradually increased radius higher on the bubble 12.

As shown in FIG. 10, brackets (shown in ghost) hold the turns of the coil or helix 50 substantially rigid. This embodiment has a fixed diameter, and would be employed where the same film material is to be produced for long periods of time. The pitch or turn spacing, and the helix angle can be selected for a given application. The helix 50 will influence the rotation of the tubular extrusion 12 as it passes through the stabilizer or sizing cage. The pitch and direction of the spiral can be selected to enhance or to counter the effect of the die 10, which can also rotate during operation. The helix 50 as shown here is a right-hand spiral, but a left-hand spiral could be used in an appropriate application.

Piping or tubing 58 is shown here connected to ends of the helix 50 to connect respectively to a source and a return for coolant fluid, which may be water or another liquid coolant, or which may be air or another gas.

While not shown here, there can be other, intermediate guide members positioned along the tubular extrusion or bubble 12, and these can also include a wear strip of a lubricious plastic resin material. Also, the guide members according to other possible embodiments of this invention may be of other curved shapes, with the construction being suited to the particular film product being manufactured.

While this invention has been described in detail with reference to selected preferred embodiments, it should be recognized that the invention is not limited to those embodiments. Rather, many modifications and variations will present themselves to persons skilled in the art without departing from the scope and spirit of the invention.

I claim:

1. An external stabilizer arrangement for a plastic film blowing apparatus in which tubular die means, fed with a supply of molten thermoplastic polymer, extrudes a tube of the molten polymer and which injects air into said extruded tube to inflate the tube and expand the wall of the tube into a film of a desired thickness; and wherein means positioned above said die means draw the tube vertically upward and collapse and flatten the film; the external stabilizer arrangement comprising frame means surrounding the extruded tube above said die means; and a helical guide member supported on said frame means and disposed coaxially with said extruded tube, said helical guide member having a finite helix angle; said guide member including a helical extrusion of a light-weight material having a profile that is rounded on a side that faces the extruded tube such that said extrusion has a rounded front surface; and a wear resistant material disposed on said rounded front surface of said extrusion.

2. The external stabilizer of claim 1 wherein said extrusion of light-weight material has a generally mushroom-shaped cross section.

3. The external stabilizer of claim 1 wherein said extrusion has an interior opening that extends for the length thereof, and piping means for creating a flow of a fluid coolant through said interior opening.

4. The external stabilizer of claim 1 wherein said wear resistant material includes a wear cover fitted onto the front surface of said extrusion, and being formed of a plastic synthetic resin that is impregnated with a lubricating agent.

5. The external stabilizer of claim 1 wherein said frame means holds said helical guide member rigidly in place.

6. The external stabilizer of claim 1, wherein said helical guide member extends for a plurality of turns.

7. The external stabilizer of claim 4, wherein said wear cover has a profile that is generally C-shaped.

8. An external stabilizer arrangement for a plastic film blowing apparatus in which tubular die means, fed with a supply of molten thermoplastic polymer, extrudes a tube of the molten polymer and which injects air into said extruded tube to inflate the tube and expand the wall of the tube into a film of a desired thickness; and wherein means positioned above said die means draw the tube vertically upward and collapse and flatten the film; the external stabilizer arrangement comprising frame means surrounding the extruded tube above said die means; and a helical guide member supported on said frame means and disposed coaxially with said extruded tube, said helical guide member spiraling continuously around said extruded tube for one or more complete turns; said guide member including a helical extrusion of a light-weight metal having a profile that is rounded on a side that faces the extruded tube such that said extrusion has a rounded front surface; and a wear resistant material disposed on said rounded front surface of said extrusion.

* * * * *

UNITED STATES PATENT AND TRADEMARK OFFICE
CERTIFICATE OF CORRECTION

PATENT NO. : 5,942,256

DATED : August 24, 1999

INVENTOR(S) : Earl T. Pottorff

It is certified that error appears in the above-identified patent and that said Letters Patent is hereby corrected as shown below:

In Col. 4, Line 38:

--reference numeral 10 should be deleted--.

Signed and Sealed this

Twenty-eighth Day of December, 1999

Attest:

Attesting Officer

Q. TODD DICKINSON

Acting Commissioner of Patents and Trademarks